United States Patent
Thorhauge et al.

(10) Patent No.: US 8,724,213 B2
(45) Date of Patent: May 13, 2014

(54) HIGH-POWER ELECTROMAGNETIC SUM FREQUENCY GENERATOR SYSTEM

(75) Inventors: Morten Thorhauge, Bagsvaerd (DK); Jesper Liltorp Mortensen, Soborg (DK); Jesper Rubech Rasmussen, Hellerup (DK)

(73) Assignee: Advalight Aps, Copenhagen (DE)

( * ) Notice: Subject to any disclaimer, the term of this patent is extended or adjusted under 35 U.S.C. 154(b) by 216 days.

(21) Appl. No.: 13/501,975

(22) PCT Filed: Oct. 14, 2010

(86) PCT No.: PCT/DK2010/050269
§ 371 (c)(1),
(2), (4) Date: Apr. 13, 2012

(87) PCT Pub. No.: WO2011/044913
PCT Pub. Date: Apr. 21, 2011

(65) Prior Publication Data
US 2012/0200911 A1    Aug. 9, 2012

(30) Foreign Application Priority Data
Oct. 14, 2009    (EP) .................................... 09173000

(51) Int. Cl.
*G02F 1/355* (2006.01)
*G02F 1/35* (2006.01)

(52) U.S. Cl.
USPC .......................................... 359/326; 372/22

(58) Field of Classification Search
USPC ................ 359/326–332; 372/21–22
See application file for complete search history.

(56) References Cited

U.S. PATENT DOCUMENTS

| | | | | |
|---|---|---|---|---|
| 3,619,637 A * | 11/1971 | Goto | | 359/328 |
| 4,272,694 A * | 6/1981 | Jacobs | | 359/329 |
| 5,247,389 A * | 9/1993 | Beausoleil | | 359/326 |
| 6,441,948 B1 | 8/2002 | Wu et al. | | |
| 7,286,282 B2 * | 10/2007 | Kojima et al. | | 359/326 |
| 7,738,162 B2 * | 6/2010 | Mizuuchi et al. | | 359/326 |
| 8,102,593 B2 * | 1/2012 | Mu et al. | | 359/326 |

OTHER PUBLICATIONS

Nishikawa, T., et al., "Efficient 494-mW Sum-frequency Generation of 589-nm Light by Using a Periodically Poled LiNbO3 Ridge Waveguide," IEEE, 2009, pp. 1.
Thorhauge, Morten, et al., "Synchronized Actively Q-Swtiched Nd:YAG Laser Generating 3 W Average Power at 589 nm.," IEEE, 2009, pp. 1.

* cited by examiner

*Primary Examiner* — Daniel Petkovsek
(74) *Attorney, Agent, or Firm* — Nath, Goldberg & Meyer; Jerald L. Meyer; Stanley N. Protigal

(57) ABSTRACT

A High-power sum frequency generator system including a first electromagnetic source for generating a first fundamental field and a second fundamental field emitted along a propagation path, and a first nonlinear component and a second nonlinear component arranged in series along the propagation path. The first nonlinear component generates a first sum frequency field from the first fundamental field and the second fundamental field, the first sum frequency field having a first polarization. The second nonlinear component generates a second sum frequency field from the first and second fundamental fields, the second sum frequency field having a second polarization. The system has an output that includes the first sum frequency field and the second sum frequency field, and a direction of the first polarization forms a mutual angle with a direction of the second polarization such that the two polarizations are non-parallel.

15 Claims, 3 Drawing Sheets

HIGH-POWER ELECTROMAGNETIC SUM FREQUENCY GENERATOR SYSTEM

This is a National Phase Application filed under 35 U.S.C. 371 as a national stage of PCT/DK2010/050269, filed Oct. 14, 2010 and claims priority benefit from European Application No. 09173000.2, filed Oct. 14, 2009, the content of each of which is hereby incorporated by reference in its entirety.

TECHNICAL FIELD

The present invention relates to a high-power sum frequency generator system comprising at least a first electromagnetic source such as a laser for generating a first fundamental field and a second fundamental field emitted along a propagation path. Further, the present invention relates to a method for generation of sum frequency electromagnetic fields from two incident fundamental fields.

BACKGROUND

It is well known in the art to generate a light field by sum frequency generation of two fundamental fields in a nonlinear component. The generated field will have a frequency that is the sum of the frequencies of the two fundamental fields. If the two fundamental fields have the same frequencies, the process is called second harmonic generation. A limiting effect in the process of sum frequency generation is that as the sum frequency field has reached a certain power level conversion will in general be reversed so that power is transferred from the sum frequency field to the fundamental fields. This process is called back-conversion.

A system for sum-frequency generation of 589 nm light by using a periodically poled $LiNbO_3$ ridge wave guide is disclosed in Nishikawa et al., European Conference on Lasers and Electro-Optics and the European Quantum Electronics Conference (CLEO Europe—EQEC 2009), IEEE, Piscataway/NJ, USA 14 Jun. 2009, ISBN: 978-1-4244-4079-5. In the disclosed system, light from two Nd:YAG lasers with an output wavelength of 1064 nm and 1319 nm, respectively, is combined and coupled into a periodically poled lithium niobate module for generating laser output at a wavelength of 589 nm.

DISCLOSURE OF THE INVENTION

It is an object of the present invention to obtain a new high-power sum frequency generator system and/or a method for generating sum frequency electromagnetic fields, which overcome or ameliorates at least one of the disadvantages of the prior art or which provides a useful alternative.

According to the invention, the object is achieved by a high-power sum frequency field generator system comprising:
  at least a first electromagnetic source such as a laser for generating a first fundamental field and a second fundamental field emitted along a propagation path, and
  a first nonlinear component and a second nonlinear component arranged in series along the propagation path, wherein:
  the first nonlinear component is adapted for generating a first sum frequency field from the first fundamental field and the second fundamental field, the first sum frequency field having a first polarization,
  the second nonlinear component is adapted for generating a second sum frequency field from the first and second incident fundamental fields, the second sum frequency field having a second polarization,
  the first and second sum frequency fields both propagating along the propagation path, and wherein
  the system has an output comprising the first sum frequency field and the second sum frequency field, and wherein a direction of the first polarization forms an angle with a direction of the second polarization such that the two polarizations are non-parallel. In this way, an electromagnetic sum frequency field is generated as a superposition of two electromagnetic fields with different directions of polarization. It follows from the nonlinear process involved that the first sum frequency field and the second sum frequency field have nominally identical frequencies. This helps to minimize back-conversion from the first sum frequency field into the fundamental fields as the power level of the first sum frequency field increases, which would otherwise limit performance. Instead, ideally, maximum power is converted in the first nonlinear component before any residual parts of the fundamental fields are launched along the first sum frequency field into the second nonlinear component. In a non-ideal case, less than the maximum power obtainable is converted in the first nonlinear component before the residual parts are launched into the second nonlinear component. This non-ideal case will often be encountered, e.g. in systems designed for operating with variable output power. In the second nonlinear component, additional power is converted from the incident fundamental fields into the second sum frequency field, while the first sum frequency field merely propagates through the component. Power in the first sum frequency field will not be back-converted in the second nonlinear component, since it is not phase-matched to the fundamental fields in this component, but only in the first nonlinear component. Likewise, if the order of the two nonlinear components is reversed, power in the second sum frequency field is not back-converted in the first nonlinear component, since it is only phase-matched to the fundamental fields in the second nonlinear component.

Definitions: Electromagnetic fields are here to be understood as radiation comprising vacuum wavelengths in the range from 10 nm to 1000 μm, e.g. covering the ultra-violet, visible, infra-red, and terahertz range. Throughout this text, the term "wavelength" is to be understood as the vacuum wavelength of radiation with a given frequency.

In general, the polarization direction of the first sum frequency field may have an angle in the range 0-180 degrees with the first fundamental field, and an angle in the range 0-180 degrees with the second fundamental field. The angle between the polarization direction of the first sum frequency field and the polarization direction of the second sum frequency field may also generally be in the range 0-180 degrees. The two fundamental fields may be polarized with any mutual angle, i.e. in the range 0-180 degrees. Since all polarization direction may be seen as a linear combination of two orthogonal contributions, complete decoupling of the first sum frequency field from the second sum frequency field may only be achieved when the mutual angle is 90 degrees. However, improved performance of the sum frequency generator system may be obtained in a broader range, such as with a mutual angle between polarization directions of the first and second sum frequency field in the range 45-135 degrees, or 60-120 degrees, or even 80-100 degrees.

According to an embodiment of the invention, the first nonlinear component is a nonlinear crystal for a Type III phase-matching, and the second nonlinear component is a nonlinear crystal for a Type I phase-matching. Thus, if the incident fundamental fields are linearly polarized parallel to each other, the first sum frequency field is generated linearly polarized along a direction parallel to the polarization direction of the fundamental fields. In contrast, the second sum frequency field is generated linearly polarized orthogonal to the two incident fields. From this follows, that unless the polarization direction of the incident fundamental fields is changed between the first and second nonlinear component, the two sum frequency fields will be generated with polarization directions orthogonal to each other. Generally, the order of the two nonlinear components along the propagation path may be reversed. However, for high-power systems, it has surprisingly been found that a greater break-down power threshold may be achieved by the stated order. This is due to the fact that Type I crystal typically have a higher break-down power threshold than Type III crystals, and that the breakdown threshold is typically much lower at the shorter wavelengths of the sum frequency fields than at the longer wavelengths of the fundamental fields. Thus, the Type III crystal should advantageously be arranged to generate the first sum frequency field, and the Type I crystal should generate the second sum frequency field and simultaneously allow the first sum frequency field to co-propagate through.

According to another embodiment of the invention, the first nonlinear component is a nonlinear crystal is chosen from the group of periodically poled PP lithium niobate PPLN, PP potassium titanyl phosphate PPKTP, PP lithium tantalate PPLTa, or any other nonlinear crystal suitable for providing Type III phase-matching. These choices of crystals are particularly advantageous for generation of sum frequency fields with high field powers and/or with high conversion efficiency.

According to another embodiment of the invention, the second nonlinear component is a nonlinear crystal chosen from the group of lithium triborate LBO, beta barium borate BBO, bismuth triborate BiBO, cesium lithium borate CLBO, lithium niobate LN, or any other nonlinear crystal suitable for providing Type I phase-matching. These choices of crystals are particularly advantageous for generation of sum frequency fields with high field powers. For example, LBO is particularly advantageous for sum frequency generation between fundamental fields with wavelengths 1319 nm and 1064 nm, since this crystal allows for uncritical phase matching, i.e. no walk-off will occur between the fundamental fields and the generated field. Walk-off reduces the efficiency of critically phase-matched (bulk) crystals.

In an alternative embodiment for generation of sum frequency fields from incident fundamental fields, wherein the incident fundamental fields are polarized orthogonal to each other, the first and/or second nonlinear component is a nonlinear crystal comprising lithium triborate LBO, beta barium borate BBO, bismuth triborate BiBO, cesium lithium borate CLBO or potassium titanyl phosphate KTP.

According to another embodiment of the invention, the first nonlinear crystal and/or the second nonlinear crystal has a length along the propagation path of 1-50 mm, or 3-30 mm for bulk crystals, or even 1-20 mm for periodically poled PP crystals. Component length should generally be chosen to achieve maximum power of the generated sum frequency field for typical power levels of the incident fundamental fields. However, if the crystals are chosen to be too long, the sum frequency field generated in the crystal will begin to be back-converted into the fundamental fields. Indeed, if the crystal is even longer, all generated power in the sum frequency field will be converted back into the fundamental fields.

According to another embodiment of the invention, the first and second nonlinear component are unitarily formed as a periodically poled PP crystal, the PP crystal having at least a first and a second section, wherein the first section is adapted for generating the first sum frequency field, and the second section is adapted for generating the second sum frequency field. In this way, a particularly compact and rugged sum frequency generator may be realized, since the two nonlinear components are provided as one unit. Thus, no alignment between the two components is needed during assembly, and no misalignment can occur in storage or under operation.

In a specific embodiment according to a preceding embodiment, the PP crystal comprises multiple alternating first and second sections, i.e. so that the propagating electromagnetic fields first propagate through a first section, then a second section, then another first section, another second section, etc.

According to another embodiment of the invention, the first section has a first poling period and the second section has a second poling period, wherein the first poling period provides phase-matching for generation of the first sum frequency field having a polarization orthogonal to the polarization of incident fundamental fields, and wherein the second poling period provides phase-matching for generation of the second sum frequency field having a polarization parallel to the polarization of the incident fundamental fields. In this way, the first sum frequency field is orthogonal and thus independent of the second sum frequency field. Therefore, no back-conversion occurs between radiation in the first and second sum frequency field, thereby increasing the maximum power that can be generated in the device.

According to another embodiment of the invention, the periodically poled PP crystal comprises lithium tantalate LTa, with the symbol $LiTaO_3$, or another material with a second-order susceptibility tensor which may support phase-matching for generation of both the first and second sum frequency fields. Use of a PPLTa crystal is advantageous for high-power applications, due to the high damage threshold of the material. This is particularly the case for generation of visible light with powers larger than 0.5 W-1.0 W, where other common choices, such as PPKTP or PPLN are not sufficiently robust. However, for lower power levels far from the damage threshold limit, PPKTP or PPLN may be advantageous due to higher nonlinear coefficients, $d_{eff}$, than for PPLTa.

According to another embodiment of the invention, the first and second nonlinear component are unitarily formed as an aperiodically poled AP crystal, wherein the AP crystal is adapted for generating the first and second sum frequency field by simultaneously providing phase-matching between the first and second incident fundamental fields and the first sum frequency field, and between the first and second incident fundamental fields and the second sum frequency field. In this way, a particularly compact device may be achieved, since both of the two sum frequency fields may be generated along the full length of the AP crystal.

According to another embodiment of the invention, the system further comprises at least a first optical component along the propagation path and between the first nonlinear component and the second nonlinear component. In a specific embodiment, the optical component is any one of a lens, a dichroic or polarisation beam splitter, a rotator, a mirror, or any other passive or active component. The system may comprise additional optical components chosen from the same class. An optical component in form of a lens between the first and second nonlinear component may, e.g., be used to refocus the electromagnetic fields before launch of the fields into the second nonlinear component.

In another specific embodiment, one or both the nonlinear components may be comprised in one or more cavities. E.g. one nonlinear component in a single cavity and the other nonlinear component outside the cavity, both nonlinear components in a single cavity, or one nonlinear component in one cavity and the other nonlinear component in another cavity. According to this embodiment, the optical components would be mirrors with high transmission for the sum frequency fields and partial or high transmission for the fundamental fields.

Furthermore, according to the invention, the object is also achieved by a method for generating sum frequency electromagnetic fields from two incident fundamental fields, wherein the method comprises the steps of:

a) providing a first fundamental field and a second fundamental field, b) propagating the first and second fundamental fields through a first nonlinear component, thus generating a first sum frequency field from the first and second fundamental fields, the first sum frequency field having a first polarization, and c) propagating the first and second fundamental field and the first sum frequency field through a second nonlinear component, thus generating a second sum frequency field from the first and second fundamental fields, the second sum frequency field having a second polarization, the first and second polarization being non-parallel. In this way, an efficient generation of sum frequency fields is achieved, since limitations in maximum power obtainable due to back-conversion are mitigated. Specifically, the first sum frequency field is only phase-matched to the incident fundamental fields within the first and not in the second nonlinear component. Thus conversion of power in the first sum frequency field back into the incident fundamental fields may only take place in the first nonlinear component, and not in the second nonlinear component. Likewise, conversion of the power in the second sum frequency field back into the incident fundamental fields may only take place in the second nonlinear component, and not in the first nonlinear component.

According to an embodiment of the inventive method, the polarization of the first sum frequency field is substantially orthogonal to the polarization of the second sum frequency field. In this way, an overlap between the first and second sum frequency field is minimized, thus preventing back-conversion.

According to another embodiment of the inventive method, the first nonlinear component is a crystal of a Type III and the second nonlinear component is a crystal of Type I. In this way, the first nonlinear component is adapted for generating a sum frequency field with a polarization parallel to the polarization of the incident fundamental fields, and the second nonlinear component is adapted for generating a sum frequency field with a polarization orthogonal to the polarization of the incident fundamental fields. Generally, the order of the two nonlinear components along the propagation path may be reversed. However, for high-power systems, it has surprisingly been found that a greater break-down power threshold may be achieved by the stated order. This is due to the fact that Type I crystal typically have a higher break-down power threshold than Type III crystals, and that the break-down threshold is typically much lower at the shorter wavelengths of the sum frequency fields than at the longer wavelengths of the fundamental fields. Thus, the Type III crystal should advantageously be arranged to generate the first sum frequency field, and the Type I crystal should generate the second sum frequency field and simultaneously allow the first sum frequency field to co-propagate through.

According to an embodiment of the inventive method for second harmonic generation, the first fundamental field and the second fundamental field are degenerate. Second harmonic generation is a special case of sum frequency generation, wherein the first and second fundamental fields are degenerate, i.e. identical in wavelength, propagation direction, phase, and polarization. The generated field has a frequency which is double the frequency of the fundamental fields.

According to an embodiment of the inventive method for generation of a sum frequency field with a wavelength of nominally 589 nm, the first fundamental field has a wavelength of nominally 1064 nm, and the second fundamental field has a wavelength of nominally 1319 nm.

BRIEF DESCRIPTION OF THE DRAWINGS

The invention will be described in detail below in reference to the drawings, in which.

DETAILED DESCRIPTION OF THE INVENTION

Figure 1:
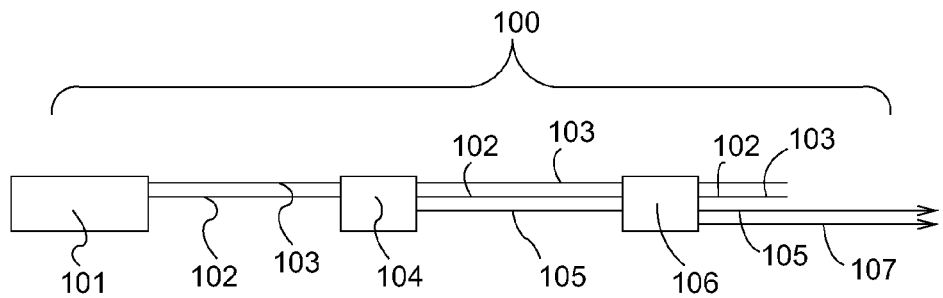
FIG. 1 is a schematic of an embodiment of the invention.

FIG. 1 shows a schematic of a high-power electromagnetic sum frequency generator system 100 according to the invention. An electromagnetic source 101, typically a laser, generates two fundamental fields, namely the first fundamental field 102 and the second fundamental field 103, which are emitted along a propagation path. The fundamental fields 102, 103 are launched into a first nonlinear component 104, thus generating a first sum frequency field 105. The first sum frequency field 105 is generated with one prevailing direction of polarization, e.g. orthogonal to or parallel with the polarization direction of the fundamental fields 102, 103. Subsequently, the first and second fundamental field 102, 103 are launched along with the first sum frequency field 105 into a second nonlinear component 106. Here, a second sum frequency field 107 is generated from the fundamental fields 102, 103, while the first sum frequency field 105 merely propagates through the second nonlinear component 106. The second sum frequency field 107 is also generated with one prevailing polarization direction that is different from the polarization direction of the first sum frequency field 105. In this way, the first sum frequency field 105 is prevented from taking part in the nonlinear processes within the second nonlinear component 106, thus minimizing back-conversion.

FIG. 2 shows the polarization directions of fundamental and generated fields in more detail for one embodiment of the invention. In FIG. 2a, the first 202a and second 203a fundamental fields are linearly polarized with polarization directions parallel to each other. Within the first nonlinear component 204a, the first sum frequency field 205a is generated with a polarization direction orthogonal to the fundamental fields 202a, 203a. The remaining power in the two fundamental fields 202a, 203a are then launched into the second nonlinear component 206a, where the second sum frequency field 207a is generated with a polarization direction parallel to the fundamental fields 202a, 203a. Thus, the first sum frequency field 205a and the second sum frequency field 207a are polarized orthogonal to each other, preventing a phase match between the two fields 205a, 207a. In the figure, a remaining part of the fundamental fields 202a, 203a are shown to be emitted from the second nonlinear component 206a, along with the first and second sum frequency field 205a, 207a. Note that the first and second sum frequency fields have the same frequency, and may thus be seen as a single depolarized field. A system 200a as shown in FIG. 2a may be achieved by using a nonlinear crystal of a type I as the first nonlinear component 204a, and a nonlinear crystal of a type III as the second nonlinear component 206a. The sequence of the first and second nonlinear components 204a, 206a may be interchanged, without deviating from the invention.

Figure 2A:
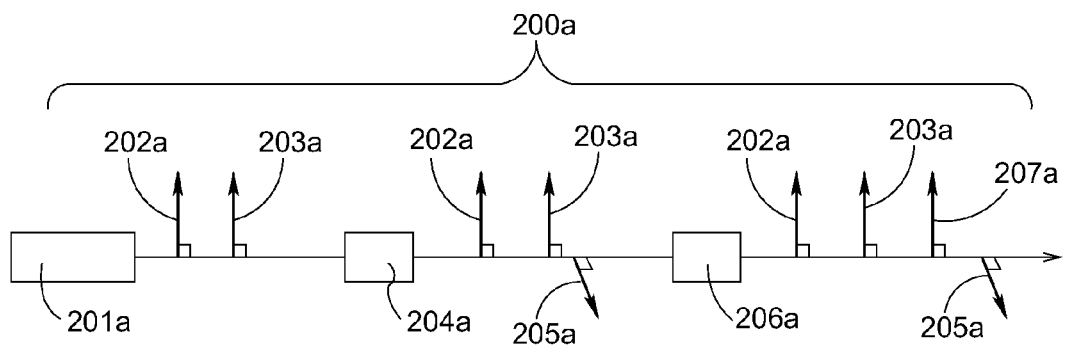
FIGS. 2a and 2b are schematics of polarization directions in two embodiments of the invention.
Figure 2B:
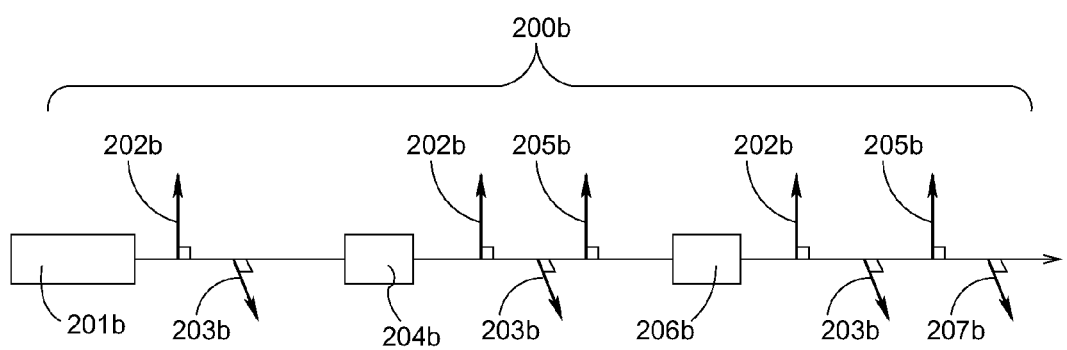

In FIG. 2b, the first 202b and second 203b fundamental fields are also linearly polarized, but with their polarization directions orthogonal to each other. In the first nonlinear component 204b, the first sum frequency field 205b is generated with a polarization direction parallel to the first fundamental field 202b. In the second nonlinear component 206b, the second sum frequency field 20b is generated with a polarization direction parallel to the second fundamental field 203b.

In an example corresponding to what is shown in FIG. 2b, for sum-frequency conversion of a first fundamental field 202b having a wavelength of 1064 nm and a second fundamental field having a wavelength of 1319 nm into a sum frequency field 205b, 207b having a wavelength of 589 nm. The two fundamental fields are both linearly polarised, orthogonal to each other. Two nonlinear LBO crystals are used as the first and second nonlinear components 204b, 206b, and each having an ordinary axis and an extra-ordinary axis. The two crystals are aligned to have their ordinary axis aligned and extra-ordinary axis aligned, respectively. The following parameters have been calculated assuming an operating temperature of 350K. The first crystal 204b is cut with angles $\theta=33.4°$, $\phi=90.0°$. In this way, the first crystal 204b is adapted to provide phase matching between 1319 nm light polarized along an extra-ordinary axis and 1064 nm light polarized along an ordinary axis, with the sum field generated being polarized along the ordinary axis. The second crystal 206b is cut with angles $\theta=19.1°$, $\phi=0.0°$, and is thereby also adapted for providing phase matching between the 1319 nm light polarized along the extra-ordinary axis and the 1064 nm light polarized along the ordinary axis. However, the second crystal 206b is adapted for generating the sum field with a polarization along the extra-ordinary axis. Thus, the sum field 205b generated in the first crystal 204b is polarized orthogonally to the sum field 207b generated in the second crystal 206b. The order of the two crystals may be reversed.

In a special case of the system shown in FIG. 2b, the first 202b and second 203b fundamental fields are two polarization components of a single field for second harmonic generation. In this case, a single fundamental field is launched into the first nonlinear component 204b at a polarization angle of approximately 45 degrees, with respect to an axis of the nonlinear component. In this way, the two polarization components will carry approximately equal powers.

Figure 2C:
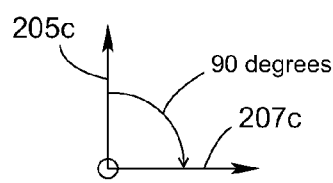
FIGS. 2c and 2d are schematics of optimum and allowable polarization directions, respectively.
Figure 2D:
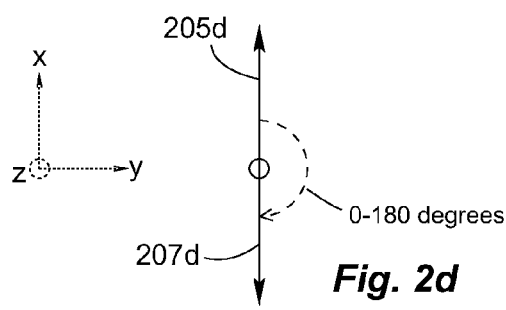

FIG. 2c shows the optimum angles between the first sum frequency field 205c and the second sum frequency field 207c, while FIG. 2d shows the allowable angles. To achieve full decoupling of the two sum frequency fields 205c, 205d; 207c, 207d, the fields must be orthogonal, as seen in FIG. 2c. However, the second sum frequency field 207c, 207d may always be described as a combination of a polarization component orthogonal and a polarization component parallel to the first sum frequency field 205c, 205d, and vice versa for the first sum frequency field. Therefore, an advantage of the inventive system is observed for all situations wherein the orthogonal polarization component is finite, i.e. for all angles between the two sum frequency fields in the range 0-180 degrees, or in the range 30-150 degrees, or even in the range 45-135 degrees. Note that all directions may be mapped in the range 0-180 degrees, since a reversal of a direction merely corresponds to a phase change.

Figure 3:
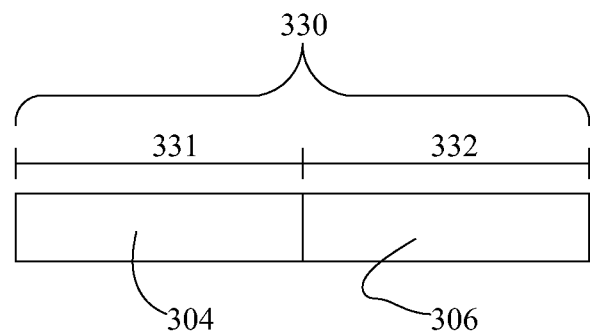
FIG. 3 is an embodiment of the first and second nonlinear components.

FIG. 3 shows an embodiment of the first 304 and second 306 nonlinear components, where they are unitarily formed in a single periodically poled PP nonlinear crystal 330. The PP crystal 330 comprises at least a first section 331 and a second section 332. The first section 331 is adapted for generating the first sum frequency field, and the second section 332 is adapted for generating the second sum frequency field.

Figure 4:
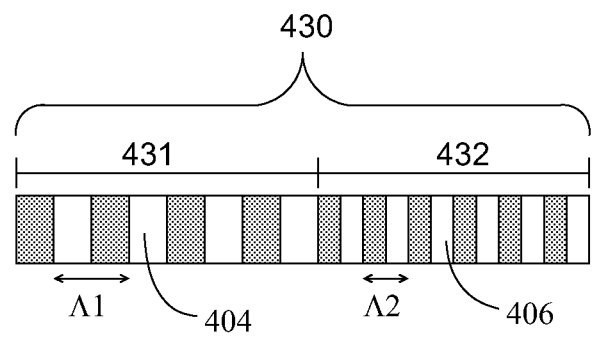
FIG. 4 is another embodiment of the first and second nonlinear components.

FIG. 4 shows an embodiment of a PP crystal 430 corresponding to the embodiment shown in FIG. 3, where like reference numerals refer to like parts. Therefore, only the differences between the two figures are described here. In this embodiment, the first section 431 is adapted for generating the first sum frequency field by periodically poling the crystal 430 with a first period $\Lambda_1$, and the second section 432 is adapted for generating the second sum frequency field by poling with a second period $\Lambda_2$. The two poling periods must be chosen, e.g. so that the first period ensures a phase matching for sum frequency generation of a field orthogonal to the fundamental fields, and so that the second period ensures phase matching for sum frequency generation of a field parallel to the fundamental fields.

Figure 5:
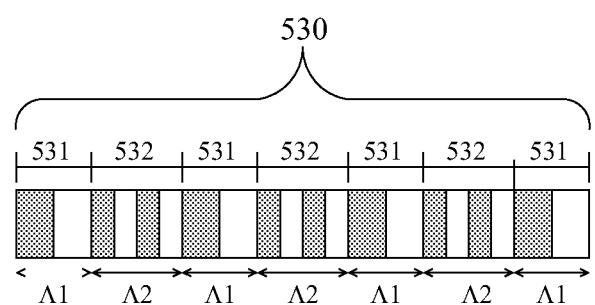
FIG. 5 is a third embodiment of the first and second nonlinear components.

FIG. 5 shows an embodiment of a PP crystal 530 corresponding to the embodiment shown in FIG. 4, where like reference numerals refer to like parts. Therefore, only the differences between the two figures are described here. In this embodiment, the crystal 530 comprises multiple first sections 531, and multiple second sections 532, arranged sequentially.

Figure 6:
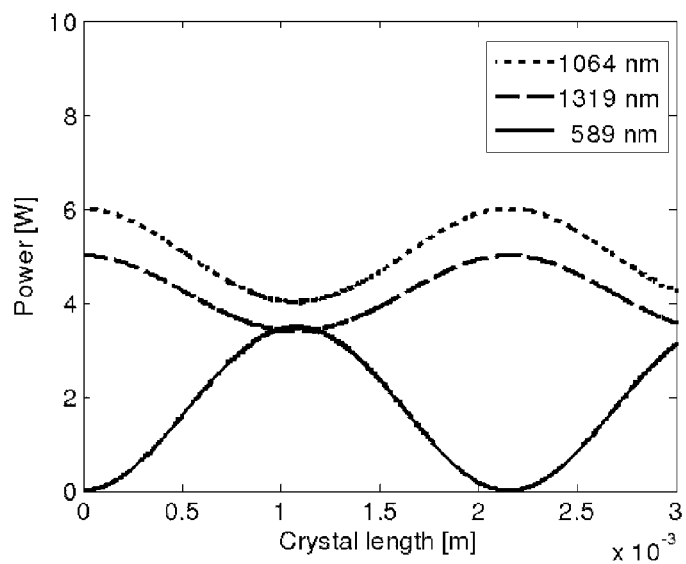
FIG. 6 is calculated data corresponding to an example.

FIG. 6 shows calculated power levels as a function of propagation distance, according to an example using a single crystal for sum frequency generation. The example considers a PPLN crystal, i.e. a Type III crystal. Two pulsed lasers are used as the electromagnetic sources generating the fundamental fields. One laser emitting light with a wavelength of 1064 nm and an average power of 6 W, the other emitting light with a wavelength of 1319 nm and an average power of 5 W. Calculation of the power levels in the three optical fields have been performed, using three coupled equations as, e.g. found in "Solid-State Laser Engineering" W. Koechner, Springer Verlag, 2006. A small phase mismatch has been assumed between the two fundamental fields. The sum frequency field with a wavelength of 589 nm is seen initially to increase with propagation distance, until a maximum of approximately 3.7 W is obtained after the fields have propagated through 1.1 mm of the crystal. If the fields are allowed to propagate further, power is converted back from the sum frequency field into the fundamental fields. After a propagation distance of 2.2 mm, the sum frequency field is seen to be fully depleted, i.e. all the power is again in the two fundamental fields.

Figure 7:
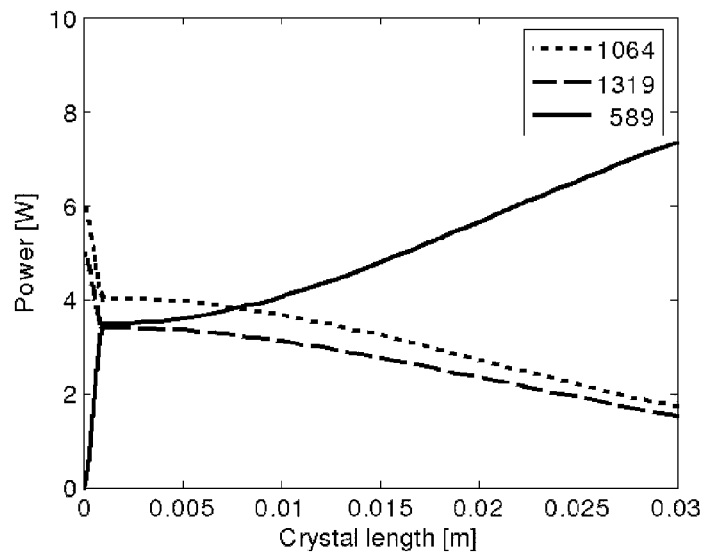
FIG. 7 is calculated data corresponding to another example.

FIG. 7 shows calculations relating to the example shown in FIG. 6. However, here, the PPLN crystal has been shortened to 1.1 mm, to obtain maximum conversion from that crystal. Subsequently, the two fundamental fields and the generated sum frequency field are launched into an LBO crystal, which may phase-match a Type-I process. The length scale now shows the combined length of the PPLN and LBO crystal; note the change of scale, compared to FIG. 6. It is seen that conversion of power into the sum frequency field continues through out the calculation domain, i.e. no back-conversion is seen. In this way, powers in excess of 7 W are seen to be generated. However, it should be noted that the sum frequency field now contains components polarized both parallel and orthogonal to the polarization direction of the fundamental fields. To common applications where high field powers are important, the mixed polarization components are of little concern.

Figure 8:
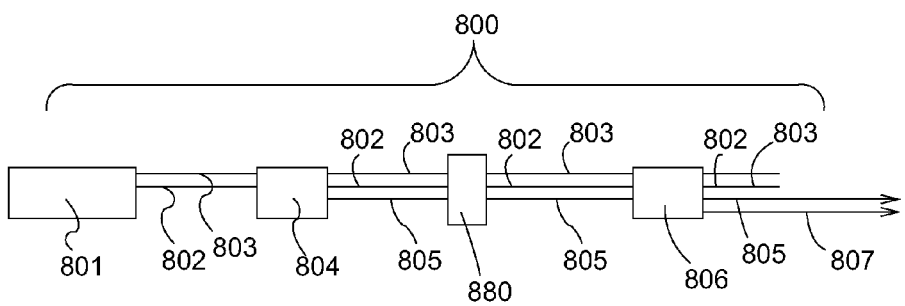
FIG. 8 is another embodiment of the inventive system.

FIG. 8 shows another embodiment of the system, corresponding to the system shown in FIG. 1, where like numbers refer to like parts. Therefore, only the differences between the two embodiments are described here. Here, an optical component is comprised between the two nonlinear components. The optical component could, e.g., be a dichroic or polarisation beam splitter, a rotator, a mirror, or any other passive or active component. Furthermore, one or both the nonlinear components may be comprised in one or more cavities. E.g. one nonlinear component in a single cavity and the other nonlinear component outside the cavity, both nonlinear components in a single cavity, or one nonlinear component in one cavity and the other nonlinear component in another cavity. In this case, the optical components would be mirrors with high transmission for the sum frequency fields and partial or high transmission for the fundamental fields. Evidently to the person skilled in the art, additional optical components may also be comprised by the system, both between the nonlinear components, and on either side of the nonlinear components.

The examples have been described according to preferred embodiments. However, the invention is not limited to these embodiments. For example, the embodiments have been shown with a single electromagnetic source for generating the two fundamental fields. However, two separate electromagnetic sources may be used for this purpose.

Also, the terms first and second nonlinear components are not meant to indicate a particular order of the two components, with regards to the propagation direction.

REFERENCE NUMERAL LIST $\Lambda_1, \Lambda_2$ poling periods
100, 200a, 200b, 800 sum frequency field generator system
101, 201a, 201b, 801 electromagnetic source
102, 202a, 202b, 802 first fundamental field
103, 203a, 203b, 803 second fundamental field
104, 204a, 204b, 304, 804 first nonlinear component
105, 205a, 205b, 205c, 205d, 805 first sum frequency field
106, 206a, 206b, 306, 806 second nonlinear component
107, 207a, 207b, 207c, 207d, 807 second sum frequency field
330, 430, 530 periodically poled nonlinear crystal
331, 431, 531 first section
332, 432, 532 second section
880 optical component

The invention claimed is:

1. High-power sum frequency generator system comprising:
at least a first electromagnetic source such as a laser for generating a first fundamental field and a second fundamental field emitted along a propagation path, and
a first nonlinear component and a second nonlinear component arranged in series along the propagation path, wherein:
the first nonlinear component is adapted for generating a first sum frequency field from the first fundamental field and the second fundamental field, the first sum frequency field having a first polarization,
the second nonlinear component is adapted for generating a second sum frequency field from the first and second incident fundamental fields, the second sum frequency field having a second polarization,
the first and second sum frequency fields both propagating along the propagation path, and wherein
the system has an output comprising the first sum frequency field and the second sum frequency field, and wherein a direction of the first polarization encloses an angle with a direction of the second polarization such that the two polarizations are non-parallel.

2. High-power electromagnetic sum frequency generator system according to claim 1, wherein the first nonlinear component is a nonlinear crystal for a Type III phase-matching, and the second nonlinear component is a nonlinear crystal for a Type I phase-matching.

3. High-power electromagnetic sum frequency generator system according to claim 2, wherein the first nonlinear crystal and/or the second nonlinear crystal has a length along the propagation path of 1-50 mm, or 3-30 mm for bulk crystals, or even 1-20 mm for periodically poled PP crystals.

4. High-power electromagnetic sum frequency generator system according to claim 1, wherein the first nonlinear component is a nonlinear crystal is chosen from the group of periodically poled (PP) lithium niobate PPLN, PP potassium titanyl phosphate PPKTP, PP lithium tantalate PPLTa, or any other nonlinear crystal suitable for providing Type III phase-matching.

5. High-power electromagnetic sum frequency generator system according to claim 1, wherein the second nonlinear component is a nonlinear crystal chosen from the group of lithium triborate LBO, beta barium borate BBO, bismuth triborate BiBO, cesium lithium borate CLBO, lithium niobate LN, or any other nonlinear crystal suitable for providing Type I phase-matching.

6. High-power electromagnetic sum frequency generator system according to claim 1, wherein the first and second nonlinear component are unitarily formed as a periodically poled PP crystal, the PP crystal having at least a first and a second section, wherein the first section is adapted for generating the first sum frequency field, and the second section is adapted for generating the second sum frequency field.

7. High-power electromagnetic sum frequency generator system according to claim 6, wherein the first section has a first poling period and the second section has a second poling period, wherein the first poling period provides phase-matching for generation of the first sum frequency field having a polarization orthogonal to the polarization of incident fundamental fields, and wherein the second poling period provides phase-matching for generation of the second sum frequency field having a polarization parallel to the polarization of the incident fundamental fields.

8. High-power electromagnetic sum frequency generator system according to claim 6, wherein the periodically poled crystal comprises lithium tantalate LTa, with the symbol $LiTaO_3$, or another material with a second-order susceptibility tensor which may support phase-matching for generation of both the first and second sum frequency fields.

9. High-power electromagnetic sum frequency generator system according to claim 1, wherein the first and second nonlinear component are unitarily formed as an aperiodically poled AP crystal, wherein the AP crystal is adapted for generating the first and second sum frequency field by simultaneously providing phase-matching between the first and second incident fundamental fields and the first sum frequency field, and between the first and second incident fundamental fields and the second sum frequency field.

10. High-power electromagnetic sum frequency generator system according to claim 1, wherein the system further comprises at least a first optical component along the propagation path and between the first nonlinear component and the second nonlinear component.

11. Method for generating sum frequency electromagnetic fields from two incident fundamental fields, wherein the method comprises the steps of:
   a) providing a first fundamental field and a second fundamental field,
   b) propagating the first and second fundamental fields through a first nonlinear component, thus generating a first sum frequency field from the first and second fundamental fields, the first sum frequency field having a first polarization, and
   c) propagating the first and second fundamental field and the first sum frequency field through a second nonlinear component, thus generating a second sum frequency field from the first and second fundamental fields, the second sum frequency field having a second polarization, the first and second polarization being non-parallel.

12. Method according to claim 11, wherein the polarization of the first sum frequency field is substantially orthogonal to the polarization of the second sum frequency field.

13. Method according to claim 11, wherein the first nonlinear component is a crystal of a type III and the second nonlinear component is a crystal of type I.

14. Method according to claim 11 for second harmonic generation, wherein the first fundamental field and the second fundamental field are degenerate.

15. Method according to claim 11 for generation of a sum frequency field with a wavelength of nominally 589 nm, wherein the first fundamental field has a wavelength of nominally 1064 nm, and the second fundamental field has a wavelength of nominally 1319 nm.

* * * * *